United States Patent Office 3,128,287

Patented Apr. 7, 1964

1

3,128,287

2,2'-OXODISUCCINIC ACID, DERIVATIVES THEREOF, AND PROCESS FOR PREPARING

Rudolph G. Berg, Groton, Conn., assignor to Chas. Pfizer & Co., Inc., New York, N.Y., a corporation of Delaware No Drawing. Filed Jan. 31, 1963, Ser. No. 255,167
6 Claims. (Cl. 260—346.8)

This invention relates to a new composition of matter, 2,2'-oxodisuccinic acid and certain derivatives thereof. Further, it deals with a process for the production of this acid, said process may also be employed for an efficient conversion of maleic acid to malic acid.

The new compounds of this invention consist of 2,2'-oxodisuccinic acid, the bis-anhydride thereof, the alkyl esters of said acid wherein each alkyl group is of 1 to 18 carbon atoms and the alkali metal and the alkaline earth metal salts of said acid.

The process of this invention comprises an efficient method of producing 2,2'-oxodisuccinic acid and malic acid. The 2,2'-oxodisuccinic acid esters claimed in this invention have been found to be efficient plasticizers and may be employed as such in the polymer industry. The 2,2'-oxodisuccinic acid and its aforementioned salts may be employed as intermediates in the preparation of the esters of this invention. The 2,2'-oxodisuccinic acid and its derivatives find further utility as synthetic lubricants, surfactants and as intermediates in the general organic synthesis of polymers and medicinals. The use of malic acid is well known as it is an edible acid and is frequently employed as an acidulant in food products. The process of this invention involves the reaction of maleic acid with a hydroxide of calcium, barium, magnesium, or strontium. In general this reaction is conducted by admixing maleic acid with an excess of the hydroxide in the presence of water. The reaction mixture is then heated for from about one day to about one month at temperatures ranging from about 50° C. to reflux temperatures. Naturally, the temperature range and time intervals employed may be reduced if this reaction is conducted under pressure. The reaction time will also vary with the temperature, that is, the higher the reaction temperature, the shorter the reaction time. When the aforementioned reaction has been completed, the insoluble metal salts of malic and 2,2'-oxodisuccinic acid are filtered and washed with several portions of water to remove any remaining unreacted starting materials. Thereafter, the filter cake is reslurried with water and admixed with a stoichiometric amount of a strong organic or inorganic acid, for example, phosphoric, sulfuric and oxalic acid have been employed. The resulting suspension which contains the free acids of this invention and the insoluble metal salt is filtered and the cake washed with several portions of water. The combined filtrate and washes is concentrated to a heavy slurry, and filtered. This filtrate is evaporated to dryness and the residue is malic acid. The aforesaid cake obtained after concentration which contains the 2,2'-oxodisuccinic acid is continuously extracted with glacial acetic acid in a Soxhlet extractor and the purified 2,2'-oxodisuccinic acid which is only slightly soluble in acetic acid precipitates in the boiler. This slurry is filtered, washed with fresh cold acetic acid and dried. The product obtained in this manner is 2,2'-oxodisuccinic acid.

As indicated above, the process of this invention produces both malic and 2,2'-oxodisuccinic acid, the ratio of these products varies with the metal hydroxide employed in the process. When strontium and barium hydroxides are employed, an almost quantitive conversion of maleic to malic acid can be effected. However, the use of calcium and magnesium hydroxide in this process produces

2 almost an equal mixture of malic and 2,2'-oxodisuccinic acids.

The bisanhydride of 2,2'-oxodisuccinic acid is prepared by contacting the acid with an excess of acetic anhydride at temperatures from about 75° C. to about 125° C. for about 1 hour to about 10 hours. Upon cooling the bisanhydride precipitates and is easily separated from the reaction mixture by filtration or decantation.

The salts of the 2,2'-oxodisuccinic acid of this invention may be prepared by many methods known to those skilled in the art. A typical procedure for the preparation of the alkali or alkaline earth metal acid salts is to react an aqueous solution of the aforesaid acid with an appropriate amount of the hydroxide of the desired alkali metal or alkaline earth metal salt. Insoluble salts produced in this manner may be separated by filtration, while a water soluble salt is separated by evaporating the aqueous solvent under reduced pressure. The esters of 2,2'-oxodisuccinic acid may also be prepared by procedures well known in the art. For example, esters can be prepared by reacting the acid with the appropriate alkanol. Another well known method of esterification is to convert the acid into its silver salt and react it with the appropriate alkyl iodide.

The starting materials employed in the process of this invention are compounds which are well known in the art and may be prepared by a number of different and well known routes. The concentration of the hydroxide employed in the aforesaid process should be an excess of the stoichiometric amount to impart alkalinity to the reaction medium. An excess of about 5 to about 50 percent is suitable, although larger excesses may be employed.

As previously indicated, the esters of this invention have been found to be efficient plasticizers in the manufacture of plastics. They have been particularly efficient in producing plastics containing vinyl chloride resins. By the term vinyl chloride resin, is understood not only the vinyl chloride polymer itself, but also copolymers of vinyl chloride with vinyl acetate, vinylidine chloride, sytrene, and the like wherein vinyl chloride constitutes the major portion of the resin. The vinyl chloride plastics which contain the plasticizers of this invention are prepared by simply admixing vinyl resin, a stabilizer and a lubricant with the plasticizer and transferring said mixture to a heated roll mill where it is further mixed to the desired extent. Thereafter, it may be formed into any desired shape in accordance with customary practice.

The following examples are given by way of illustration and are not intended to depart from the spirit and scope of the appended claims.

EXAMPLE I

A mixture of 15.9 g. of maleic anhydride in 40 ml. of water is heated with stirring to 75° C. for five minutes and then cooled to room temperature. To the resulting aqueous solution, there is added a slurry containing 15.6 g. of calcium hydroxide in 57.2 ml. of water. The mixture is refluxed with stirring for four days. The insoluble reaction product is then filtered, washed with two 15 ml. portions of hot water and re-slurried in 56 ml. of fresh water. Approximately 10 ml. of concentrated sulfuric acid is added to the slurry with cooling and the insoluble calcium sulfate which is formed is removed by filtration. The filter cake is then washed with two 15 ml. portions of fresh water. The combined filtrate and washes are concentrated to a heavy slurry, cooled to room temperature and filtered. The filtrate is evaporated to dryness under reduced pressure and the 8 g. of residue was malic acid.

The filter cake obtained by the aforesaid procedure is washed with two 5 ml. portions of ice water and dried. The resulting 10 g. residue which is a mixture of calcium sulfate and 2,2'-oxodisuccinic acid is continuously extracting with 30 ml. of glacial acetic acid in a Soxhlet extractor. The boiler slurry containing the insoluble 2,2'-oxodisuccinic acid is filtered hot, washed with 10 ml. of fresh, cold acetic acid and dried under vacuum. The product obtained in this manner is 2,2'-oxodisuccinic acid which melts with decomposition at 225° C.

The procedure employed above was repeated using magnesium hydroxide with similar results.

EXAMPLE II

The procedure employed in Example I was repeated employing strontium hydroxide and barium hydroxide. The products obtained are the same as those described in the prior example with the exception that a greater ratio of malic acid to 2,2'-oxodicuccinic acid was produced.

EXAMPLE III

A mixture containing 8.0 g. of 2,2'-oxodisuccinic acid and 6.7 g. of acetic anhydride is heated at 125° C. for 10 minutes. The insoluble product is separated by filtration and is 2,2'-oxodisuccinic acid bisanhydride which melts with decomposition at 172° C.

EXAMPLE IV

A mixture of 5 g. of 2,2'-oxodisuccinic acid, 80 ml. of n-butyl alcohol and 0.12 ml. of concentrated sulfuric acid is refluxed with azeotropic removal of water for 15 minutes. Thereafter, the mixture is concentrated under reduced pressure to 15 ml. and admixed with 50 ml. of methylene chloride. This mixture is washed successively with 50 ml. of distilled water, 25 ml. of a saturated aqueous solution of sodium bicarbonate and 25 ml. of distilled water. The organic layer is then dried over anhydrous magnesium sulfate and the remaining n-butyl alcohol and methylene chloride were removed under reduced pressure. The ester product is distilled under reduced pressure and in this manner, is obtained 4 grams of tetra-n-butyl-2,2'-oxodisuccinate which has a boiling point of 251–253° C. at 5.5 mm. of pressure and a specific gravity of 1.033 at 25° C.

EXAMPLE V

Employing essentially the same procedure as described in Example IV, the following esters were prepared:

Tetrapropyl 2,2'-oxodisuccinate
Tetraisopropyl 2,2'-oxodisuccinate
Tetra-n-hexyl 2,2'-oxodisuccinate
Tetra-2-ethyl-butyl 2,2'-oxodisuccinate
Tetrapentyl 2,2'-oxodisuccinate
Tetraheptyl 2,2'-oxodisuccinate
Tetradecyl 2,2'-oxodisuccinate
Tetratridecyl 2,2'-oxodisuccinate
Tetra-4-butyl-dodecyl 2,2'-oxodisuccinate
Tetrahexadecyl 2,2'-oxodisuccinate
Tetra-2-methyl-heptadecyl 2,2'-oxodisuccinate
Tetraoctadecyl 2,2'-oxodisuccinate

EXAMPLE VI

An aqueous solution containing 5 g. of 2,2'-oxodisuccinic acid in 35 ml. of distilled water is titrated to a pH of 7.5 with 42 ml. of a 2 N sodium hydroxide solution. The aqueous solvent is removed under reduced pressure and the residue is tetrasodium 2,2'-oxodisuccinate.

Employing a procedure similar to the aforesaid, the corresponding alkali metal and alkaline earth metal salts of 2,2'-oxodisuccinic acid are prepared.

EXAMPLE VII

A mixture of 171.2 g. of the 2,2'-oxodisuccinic acid bisanhydride is prepared as described in Example III, 324.0 g. of octadecanol and 2000 ml. of glacial acetic acid are refluxed for 12 hours. Thereafter, the reaction mixture is cooled to room temperature and stirred for an additional 0.5 hour. The resulting precipitate is filtered and washed with acetic acid. The filtrate is set aside, while the filter cake is admixed with 1000 ml. of ethyl acetate and heated to 60° C. until solution is complete. The hot solution is filtered and the filtrate allowed to cool gradually at room temperature for one hour. Subsequently, this mixture is stirred, cooled to 22° C. and filtered. The filter cake is dissolved in 1000 ml. of hot ethyl acetate and filtered through a filter precoated with diatomaceous earth. The filtrate is allowed to cool gradually for 0.5 hour, it is then stirred, cooled to 22° C., filtered and dried under vacuum. The 141 g. of product was distearyl 2,2'-oxodisuccinate which has a melting point of 82.2° to 83.0° C.

The aforesaid filtrate which had been set aside is evaporated to dryness and the 242 g. of dry residue is admixed with 2000 ml. of hexane. The mixture is heated to 60° C. and maintained at this temperature for 0.5 hour with stirring. Subsequently, the mixture is filtered hot and the filter cake is washed with hot hexane. The 106 g. of filter cake, 5 g. of carbon black and 1000 ml. of ethyl acetate are heated to 65° C. and filtered hot through a filter precoated with diatomaceous earth. The hot filtrate is allowed to gradually cool to room temperature, thereafter, the white precipitate which formed was removed by filtration and dried under vacuum. In this manner, is obtained 50.6 g. of monostearyl 2,2'-oxodisuccinate which melted at 110.6° to 112.0° C.

EXAMPLE VIII 13.2 g. of 2,2'-oxodisuccinic acid in 55 ml. of distilled water is admixed with stirring with 50 ml. of a 4 N sodium hydroxide solution. The aqueous solvent is then removed under reduced pressure and the residue is disodium 2,2'-oxodisuccinate.

Employing procedures similar to the aforementioned, the mono, di, and tri alkali metal salts of 2,2'-oxodisuccinic acid are prepared.

EXAMPLE IX

A mixture of 6.6 g. of 2,2'-oxodisuccinic acid, 2.5 g. of propyl alcohol, 4.9 g. of sulfuric acid and 35 ml. of dioxane is heated for 10 hours at 70° C. Thereafter, the reaction mixture is evaporated to 10 ml. under reduced pressure. The concentrate is admixed with 30 ml. of methylene chloride and successively extracted with 10 ml. of water, 5 ml. of a saturated aqueous solution of sodium bicarbonate and 5 ml. of water. Thereafter, the organic layer is dried over 5 g. of anhydrous sodium sulfate and then evaporated to dryness. The residue is shown by paper chromatography to contain a substantial amount of monopropyl 2,2'-oxodisuccinate.

EXAMPLE X

By employing procedures similar to that described in Example IX and using varying amounts of different starting alcohols, the following esters of 2,2'-oxodisuccinic acid are prepared:

Triethyl 2,2'-oxodisuccinate
Monopentyl 2,2'-oxodisuccinate
Di-2-ethyl-hexyl 2,2'-oxodisuccinate
Tridecyl 2,2'-oxodisuccinate
Mono-2-methyl-heptadecyl 2,2'-oxodisuccinate
Di-3-butyl-decyl 2,2'-oxodisuccinate

EXAMPLE XI

A mixture containing 100 g. of polyvinyl chloride, 50 g. of tetrabutyl 2,2'-oxodisuccinate, 2.5 g. of a mixture of the barium and cadmium salts of stearic acid and 0.25 g. of stearic acid is transferred to a roll mill at 330° F. The mixture is milled for approximately 30 minutes and is then calendered to produce a plastic sheet 75 mils in thickness. The plastic produced in this manner exhibited the properties described in Table I.

*Table I*

| Property | American Society for Testing Materials Number | Measurement |
|---|---|---|
| Hardness, Durometer A, 10 Secs | D 676 | 81 |
| Tensile Strength, p.s.i. | D 412 | 2,700 |
| Ultimate Elongation, Percent | D 412 | 370 |
| 100% Modulus, p.s.i. | D 412 | 1,380 |
| Low temp., $T_4$ (10,000 p.s.i.), ° C. | D 1043 | −9.5 |
| Low temp., $T_f$ (1,000,000 p.s.i.), ° C. | D 1043 | −28.7 |
| Brittle point, ° C. | D 746 | −21.9 |

What is claimed is:

1. A compound selected from the group consisting of 2,2′-oxodisuccinic acid, the bisanhydride thereof, an alkyl ester of said acid wherein each alkyl group is one to eighteen carbon atoms, an alkali metal salt and an alkaline earth metal salt thereof.

2. A process for the production of 2,2′-oxodisuccinic acid and malic acid which comprises contacting maleic acid with a metal hydroxide selected from the group consisting of calcium hydroxide, strontium hydroxide, barium hydroxide and magnesium hydroxide, in the presence of water, at a temperature from about 50° C. to about reflux temperatures for about one to about twenty days.

3. 2,2′-oxodisuccinic acid.

4. 2,2′-oxodisuccinic bisanhydride.

5. A compound selected from the group consisting of the alkyl esters of 2,2′-oxodisuccinic acid wherein each alkyl group is of one to eighteen carbon atoms.

6. A compound selected from the group consisting of the alkali metal and the alkaline earth metal salts of 2,2′-oxodisuccinic acid.

No references cited.